US009747264B2

(12) United States Patent
Cai et al.

(10) Patent No.: US 9,747,264 B2
(45) Date of Patent: Aug. 29, 2017

(54) OPTIMIZING UPDATE OPERATIONS IN HIERARCHICALLY STRUCTURED DOCUMENTS

(71) Applicant: International Business Machines Corporation, Armonk, NY (US)

(72) Inventors: Mengchu Cai, San Jose, CA (US); Rong-Hoang Chang, San Jose, CA (US); Li Chen, San Jose (CA); Yu Chen, San Jose, CA (US); Yonghua Ding, San Jose, CA (US); Eric N. Katayama, Saratoga, CA (US); Kwai Hing Man, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 14/744,479

(22) Filed: Jun. 19, 2015

(65) Prior Publication Data

US 2016/0371236 A1 Dec. 22, 2016

(51) Int. Cl.
*G06F 17/30* (2006.01)
*G06F 17/22* (2006.01)

(52) U.S. Cl.
CPC ...... *G06F 17/2247* (2013.01); *G06F 17/2241* (2013.01); *G06F 17/30011* (2013.01); *G06F 17/30365* (2013.01); *G06F 17/30908* (2013.01); *G06F 17/30923* (2013.01)

(58) Field of Classification Search
CPC combination set(s) only.
See application file for complete search history.

(56) References Cited

U.S. PATENT DOCUMENTS 7,769,727 B2 8/2010 Sivapragasam et al.
7,810,085 B2 10/2010 Shinnar et al.
7,953,742 B2 5/2011 Jain et al.
8,266,609 B2 9/2012 Harris
8,433,883 B2 4/2013 Greyzck et al.
(Continued)

OTHER PUBLICATIONS

Jayaram et al., "Split and Subsume", 2011 31st International Conference on Distributed Computing Systems, © 2011 IEEE, Research partially funded by US NSF (grants 0644013 and 0834529), DOI 10.1109/ICDCS.2011.85, pp. 824-835.
(Continued)

*Primary Examiner* — Shyue Jiunn Hwa
(74) *Attorney, Agent, or Firm* — David M. Quinn; Alexander G. Jochym

(57) ABSTRACT

Optimizing update instructions in hierarchically structured documents is provided. A pending update list including a first plurality of items is received. Each item of the first plurality of items describes an update to a hierarchically structured document. Each of one or more items of the first plurality of items is added to a subsumed update list having a second plurality of items. The subsumed update list is ordered based, at least in part, on a document order and on a target node of each of the second plurality of items. Subsume logic is applied to each of the one or more items based, at least in part, on the second plurality of items. Responsive to determining that subsume logic has been applied to each item of the first plurality of items, each of the second plurality of items of the subsumed update list is executed.

16 Claims, 8 Drawing Sheets

(56) References Cited

U.S. PATENT DOCUMENTS

| | | | |
|---|---|---|---|
| 8,495,085 | B2 | 7/2013 | Cai et al. |
| 8,694,465 | B2 | 4/2014 | O'Farrell et al. |
| 8,713,552 | B2 | 4/2014 | Horiuchi et al. |
| 2004/0060006 | A1 | 3/2004 | Lindblad et al. |
| 2005/0154701 | A1* | 7/2005 | Parunak ............ G06F 17/30734 |
| 2006/0117294 | A1* | 6/2006 | Vogler ...................... G06F 8/10 717/104 |
| 2006/0282660 | A1 | 12/2006 | Varghese et al. |
| 2007/0087756 | A1 | 4/2007 | Hoffberg |
| 2007/0143768 | A1 | 6/2007 | Inami et al. |
| 2010/0138427 | A1 | 6/2010 | Van De Par et al. |
| 2012/0093166 | A1 | 4/2012 | Rosenberg et al. |
| 2013/0028336 | A1 | 1/2013 | Limberg |
| 2013/0132493 | A1 | 5/2013 | Ozzie et al. |
| 2015/0039360 | A1 | 2/2015 | Gowdra et al. |
| 2016/0012465 | A1 | 1/2016 | Sharp |

OTHER PUBLICATIONS

Linux Defenders et al., "Method for Update Distribution", An IP.com Prior Art Database Technical Disclosure, Original Publication Date: Mar. 16, 2009, IP.com No. 000180770, IP.com Electronic Publication: Mar. 16, 2009, pp. 1-4.

Yang et al., "CLUE: Achieving Fast Update over Compressed Table for Parallel Lookup with Reduced Dynamic Redundancy", 2012 32nd IEEE International Conference on Distributed Computing Systems, © 2012 IEEE, pp. 678-687, DOI 10.1109/ICDCS.2012.79.

"XQuery Update Facility 1.0—W3C Recommendation Mar. 17, 2011", Copyright © 2011 W3C®, pp. 1-89, <http://www.w3.org/TR/xquery-update-10/>.

Cai et al., "Optimizing Update Operations in Hierarchically Structured Documents", U.S. Appl. No. 15/138,279, filed Apr. 26, 2016, 28 pages.

IBM, "Appendix P—List of IBM Patents or Patent Applications Treated as Related". 2 pages, dated Apr. 26, 2016.

Cai et al., "Optimizing Update Operations in Hierarchically Structured Documents", U.S. Appl. No. 15/412,192, filed Jan. 23, 2017, 21 pages.

Cai et al., "Optimizing Update Operations in Hierarchically Structured Documents", U.S. Appl. No. 15/412,269, filed Jan. 23, 2017, 21 pages.

Appendix P—List of IBM Patents or Patent Applications Treated as Related, Filed Herewith, 2 Pages.

* cited by examiner

Subsume Matrix 1

When incoming (new) update has same target as previous (old) update:

| | insInto | insAttr | repValue | insBf/Af | insIntoF/L | repNode | repEC | delete |
|---|---|---|---|---|---|---|---|---|
| insInto | *0 | *0 | *0 | *0 | *0 | SO | SO | SO |
| insAttr | *0 | *0 | *0 | *0 | *0 | SO | *0 | SO |
| repValue | *0 | *0 | *1 | *0 | *0 | SO | *0 | SO |
| insBf/Af | *0 | *0 | *0 | *0 | *0 | *0 | *0 | *0 |
| insIntoF/L | *0 | *0 | *0 | *0 | *0 | SO | SO | SO |
| repNode | SN | SN | SN | *0 | SN | *1 | SN | SO |
| repEC | SN | *0 | *0 | *0 | SN | SO | *1 | SO |
| delete | SN | SN | SN | *0 | SN | SO | SN | SN |

SO: subsume old PUI (remove old PUI)
SN: subsume incoming PUI (remove incoming PUI)
*0: no subsume (incoming PUI will take effect)
*1: Pending Error (mark the old PUI and remove the incoming PUI)
*2: no subsume if the incoming target is an attribute child of the old target, otherwise, SN
*3: no subsume if the old target is an attribute child of the new target, otherwise, SO

FIG. 3

Subsume Matrix 2

When target of incoming (new) update is the descendant of previous (old) update:

| old \ new | insInto | insAttr | repValue | insBf/Af | insIntoF/L | repNode | repEC | delete |
|---|---|---|---|---|---|---|---|---|
| insInto | *0 | *0 | *0 | *0 | *0 | *0 | *0 | *0 |
| insAttr | *0 | *0 | *0 | *0 | *0 | *0 | *0 | *0 |
| repValue | *0 | *0 | *0 | *0 | *0 | *0 | *0 | *0 |
| insBf/Af | *0 | *0 | *0 | *0 | *0 | *0 | *0 | *0 |
| insIntoF/L | *0 | *0 | *0 | *0 | *0 | *0 | *0 | *0 |
| repNode | SN | SN | SN | SN | SN | SN | SN | SN |
| repEC | SN | SN | *2 | SN | SN | *2 | SN | *2 |
| delete | SN | SN | SN | SN | SN | SN | SN | SN |

SO: subsume old PUI (remove old PUI)
SN: subsume incoming PUI (remove incoming PUI)
*0: no subsume (incoming PUI will take effect)
*1: Pending Error (mark the old PUI and remove the incoming PUI)
*2: no subsume if the incoming target is an attribute child of the old target, otherwise, SN
*3: no subsume if the old target is an attribute child of the new target, otherwise, SO

FIG. 4

Subsume Matrix 3

When target of previous (old) update is a descendant of incoming (new) update:

| old \ new | insInto | insAttr | repValue | insBf/Af | insIntoF/L | repNode | repEC | delete |
|---|---|---|---|---|---|---|---|---|
| insInto | *0 | *0 | *0 | *0 | *0 | SO | SO | SO |
| insAttr | *0 | *0 | *0 | *0 | *0 | SO | SO | SO |
| repValue | *0 | *0 | *0 | *0 | *0 | SO | *3 | SO |
| insBf/Af | *0 | *0 | *0 | *0 | *0 | SO | SO | SO |
| insIntoF/L | *0 | *0 | *0 | *0 | *0 | SO | SO | SO |
| repNode | *0 | *0 | *0 | *0 | *0 | SO | *3 | SO |
| repEC | *0 | *0 | *0 | *0 | *0 | SO | SO | SO |
| delete | *0 | *0 | *0 | *0 | *0 | SO | *3 | *0 |

SO: subsume old PUI (remove old PUI)
SN: subsume incoming PUI (remove incoming PUI)
*0: no subsume (incoming PUI will take effect)
*1: Pending Error (mark the old PUI and remove the incoming PUI)
*2: no subsume if the incoming target is an attribute child of the old target, otherwise, SN
*3: no subsume if the old target is an attribute child of the new target, otherwise, SO

FIG. 5

PENDING UPDATE ITEMS

```
for $i in /purchaseOrder/items/item
   insert node <comment>affordable</comment> into $i,

delete node //item[USPrice > 100]
```

```xml
<purchaseOrder orderDate="2011-05-18">
  <items>
    <item partNum="872-AA">
      <productName>Lawnmower</productName>
      <quantity>1</quantity>
      <USPrice>149.99</USPrice>
      <comment>Confirm this is
              gas powered</comment>
      <shipDate>2011-05-20</shipDate>
    </item>
    <item partNum="926-AA">
      <productName>Baby Monitor</productName>
      <quantity>2</quantity>
      <USPrice>39.98</USPrice>
      <shipDate>2011-05-22</shipDate>
    </item>
  </items>
</purchaseOrder>
```

*insert node <comment>affordable</comment> into $i,*

```xml
<purchaseOrder orderDate="2011-05-18">
  <items>
    <item partNum="872-AA">
      <productName>Lawnmower</productName>
      <quantity>1</quantity>
      <USPrice>149.99</USPrice>
      <comment>Confirm this is
              gas powered</comment>
      <shipDate>2011-05-20</shipDate>
      <comment>affordable</comment>
    </item>
    <item partNum="926-AA">
      <productName>Baby Monitor</productName>
      <quantity>2</quantity>
      <USPrice>39.98</USPrice>
      <shipDate>2011-05-22</shipDate>
      <comment>affordable</comment>
    </item>
  </items>
</purchaseOrder>
```

*delete node //item[USPrice > 100]*

```xml
<purchaseOrder orderDate="2011-05-18">
  <items>




    <item partNum="926-AA">
      <productName>Baby Monitor</productName>
      <quantity>2</quantity>
      <USPrice>39.98</USPrice>
      <shipDate>2011-05-22</shipDate>
      <comment>affordable</comment>
    </item>
  </items>
</purchaseOrder>
```

FIG. 7

OPTIMIZING UPDATE OPERATIONS IN HIERARCHICALLY STRUCTURED DOCUMENTS

BACKGROUND OF THE INVENTION

The present invention relates generally to the field of updating electronic documents, and more particularly to updating hierarchically structured electronic documents stored in databases.

There are numerous types of electronic documents that are used in various computer applications. Often these documents have a hierarchical structure. One example of a hierarchically structured document is an extended markup language (XML) document.

As hierarchically structured data, such as XML documents, become widely used as a data format, it also becomes a native data type for database systems. The storage of hierarchically structured data in relational databases poses various challenges.

Updates to XML documents may involve operations such as deleting, inserting, replacing or modifying nodes and sub-trees, which may reduce or expand the data, depending on the nature of the operation. In addition, XML indexes must be maintained for all updates.

SUMMARY

According to one embodiment of the present invention, a method is provided. The method includes: receiving, by one or more processors, a pending update list including a first plurality of items, wherein each item of the first plurality of items describes an update to a hierarchically structured document; adding, by one or more processors, each of one or more items of the first plurality of items to a subsumed update list having a second plurality of items, wherein the subsumed update list is ordered based, at least in part, on a document order and on a target node of each of the second plurality of items; applying, by one or more processors, subsume logic to each of the one or more items based, at least in part, on the second plurality of items; and responsive to determining, by one or more processors, that the subsume logic has been applied to each item of the first plurality of items, executing, by one or more processors, each of the second plurality of items of the subsumed update list.

According to another embodiment of the present invention, a computer program product is provided. The computer program product comprises a computer readable storage medium and program instructions stored on the computer readable storage medium. The program instructions include: program instructions to receive a pending update list including a first plurality of items, wherein each item of the first plurality of items describes an update to a hierarchically structured document; program instructions to add each of one or more items of the first plurality of items to a subsumed update list having a second plurality of items, wherein the subsumed update list is ordered based, at least in part, on a document order and on a target node of each of the second plurality of items; program instructions to apply subsume logic to each of the one or more items based, at least in part, on the second plurality of items; and program instructions to, responsive to determining that the subsume logic has been applied to each item of the first plurality of items, execute each of the second plurality of items of the subsumed update list.

According to another embodiment of the present invention, a computer system is provided. The computer system includes one or more computer processors, one or more computer readable storage media, and program instructions stored on the computer readable storage media for execution by at least one of the one or more processors. The program instructions include: program instructions to receive a pending update list including a first plurality of items, wherein each item of the first plurality of items describes an update to a hierarchically structured document; program instructions to add each of one or more items of the first plurality of items to a subsumed update list having a second plurality of items, wherein the subsumed update list is ordered based, at least in part, on a document order and on a target node of each of the second plurality of items; program instructions to apply subsume logic to each of the one or more items based, at least in part, on the second plurality of items; and program instructions to, responsive to determining that the subsume logic has been applied to each item of the first plurality of items, execute each of the second plurality of items of the subsumed update list.

BRIEF DESCRIPTION OF THE DRAWINGS

FIG. 3 illustrates a subsume matrix for consolidating pending update items if an incoming update item has the same target node as a previous update item, on a computing device within the computing environment of FIG. 1, in accordance with an embodiment of the present disclosure;

FIG. 4 illustrates a subsume matrix for consolidating pending update items if a target node of an incoming pending update item is a descendant of a target node of a previous pending update item, on a computing device within the computing environment of FIG. 1, in accordance with an embodiment of the present disclosure;

FIG. 5 illustrates a subsume matrix for consolidating pending update items if a target node of a previous pending update item is a descendant of a target node of an incoming pending update item, on a computing device within the computing environment of FIG. 1, in accordance with an embodiment of the present disclosure;

FIG. 7 illustrates an example of applying redundant update operations to a selection of an XML document, on a computing device within the computing environment of FIG. 1, in accordance with an embodiment of the present disclosure.

DETAILED DESCRIPTION

Embodiments of the present invention recognize that there are several ways to perform updates to large, hierarchically structured documents. In one approach, a single statement is used to execute multiple partial updates, which may be on different target nodes of the large document. In another approach, updates are performed one at a time, requiring one traversal of the entire document with each update.

Embodiments of the present invention provide for optimizing processing of updates to large, hierarchically structured documents by pre-processing update requests to identify and eliminate unnecessary update operations before applying updates to hierarchically structured documents. Some embodiments of the present invention promote increased computational efficiency by pre-processing updates to a hierarchically structured document. For example, embodiments provide that pre-processing updates to a hierarchically structured document prior to traversing the document promotes increased computational efficiency relative to processing the updates while traversing the document.

The block diagrams, flowchart, and drawings in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present disclosure will now be described in detail with reference to the Figures.

Figure 1:
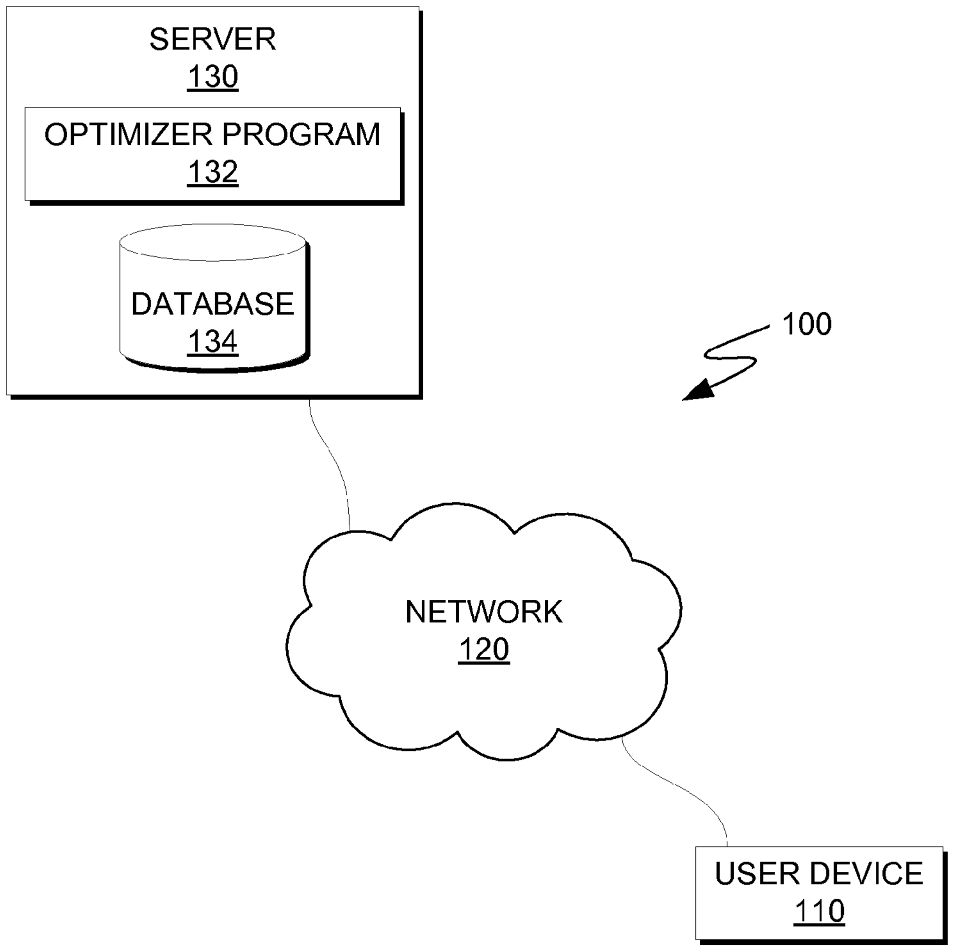
FIG. 1 is a functional block diagram illustrating a computing environment, in accordance with an embodiment of the present disclosure.

FIG. 1 is a functional block diagram illustrating a computing environment, in accordance with an embodiment of the present disclosure. For example, FIG. 1 is a functional block diagram illustrating computing environment 100. Computing environment 100 includes server 130 and user device 110 connected over network 120. Server 130 includes optimizer program 132 and database 134.

In this exemplary embodiment, optimizer program 132 and database 134 are stored on server 130. In other embodiments, one or both of optimizer program 132 and database 134 may reside on another computing device, provided that each can access user device 110, database 134, and each other. In yet other embodiments, optimizer program 132 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between server 130 and user device 110, in accordance with a desired embodiment of the present invention.

User device 110 is a device that allows access to server 130. In various embodiments, user device 110 is a computing device that can be a standalone device, a server, a laptop computer, a tablet computer, a netbook computer, a personal computer (PC), or a desktop computer. In another embodiment, a user device 110 represents a computing system utilizing clustered computers and components to act as a single pool of seamless resources. In general, a user device 110 can be any computing device or a combination of devices with access to server 130 over network 120. User device 110 may include internal and external hardware components, as depicted and described in further detail with respect to FIG. 8.

In various embodiments, server 130 is a computing device that can be a standalone device, a server, a laptop computer, a tablet computer, a netbook computer, a personal computer (PC), or a desktop computer. In another embodiment, server 130 represents a computing system utilizing clustered computers and components to act as a single pool of seamless resources. In general, server 130 can be any computing device or a combination of devices with access to user device 110, and with access to and/or capable of executing optimizer program 132. Server 130 may include internal and external hardware components, as depicted and described in further detail with respect to FIG. 8.

Optimizer program 132 operates to optimize the processing of update operations on hierarchically structured documents by pre-processing update requests. Optimizer program 132 identifies ordered dependencies, consolidates redundant operations, and removes conflicting operations to improve the performance of executing update operations.

Database 134 is a data repository that may be written to and read by optimizer program 132. Hierarchically structured documents, subsumed update lists (SULs), subsume rules and matrices, and other data required for optimizer program 132 to perform operations may be stored to database 134. In some embodiments, database 134 may be written to and read by programs and entities outside of computing environment 100 in order to populate the repository with any of the data items mentioned above.

Figure 2:
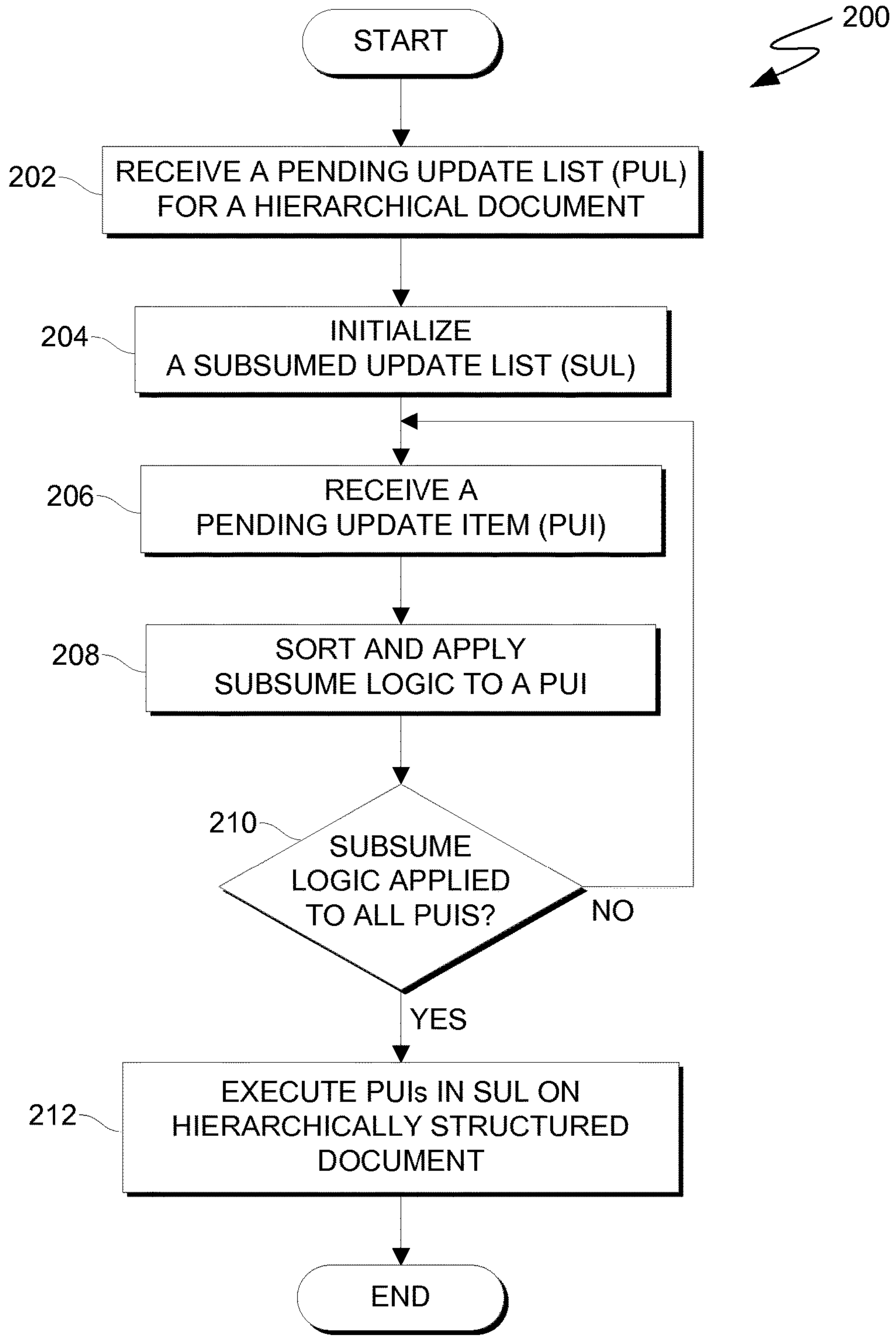
FIG. 2 is a flowchart depicting operations for optimizing update operations for hierarchically structured documents, on a computing device within the computing environment of FIG. 1, in accordance with an embodiment of the present disclosure.

FIG. 2 is a flowchart depicting operations for optimizing update operations for hierarchically structured documents, on a computing device within the computing environment of FIG. 1, in accordance with an embodiment of the present disclosure. For example, FIG. 2 is a flowchart depicting operations 200 of optimizer program 132, on server 130 within computing environment 100.

In step 202, optimizer program 132 receives a pending update list (PUL) for a hierarchically structured document. The PUL is a list that identifies update operations that optimizer program 132 will execute on one of a plurality of hierarchically structured documents stored in database 134. In one embodiment, a PUL includes two or more of a plurality of pending update items (PUI). In one embodiment, each of the two or more PUIs includes two or more attributes associated with an update operation described by the PUI. The two attributes include: an update operation type (e.g., delete node, insert into, replace value) and a target node(s) on which optimizer program 132 will perform the update operation. In some embodiments, each of the two or more PUIs includes three or more attributes associated with an update operation that optimizer program 132 will perform. The three attributes include: an update operation type, a target node(s), and a new value(s) (e.g., a new name for a specific value of an item in a replace value operation). An example of a PUI that has three attributes is: "for $i in/purchaseOrder/items/item,insert node <comment> affordable</comment> into $i." In this example, the operation type is "insert node", the target nodes are all existing subnodes "item" in the lineage of "purchaseOrder/items", and the new value is "<comment>affordable</comment>", which will be inserted as the last element in each node list identified as "item".

In step 204, optimizer program 132 initializes a subsumed update list (SUL) to be empty prior to receiving a first of a plurality of PUIs in the PUL. An SUL is a list of PUIs that optimizer program 132 populates using an iterative process of applying one or more subsume rules to each of the plurality of PUIs in the PUL. Subsume rules specify how optimizer program 132, subsequent to comparing information (e.g., attributes, relative location within a PUL) associated with each of a first PUI and a second PUI, determines whether one or both of the first PUI and the second PUI are valid PUIs, one or both of the PUIs include an update operation that is invalid, or the first (second) PUI subsumes the second (first) PUI. A first PUI subsumes a second PUI (the subsumed PUI) responsive to optimizer program 132 determining that the update operation associated with the second PUI is unnecessary. For example, if a first PUI includes an update operation to replace a value on a first target node, and a second PUI includes an update operation to delete the first target node, there is no benefit in performing the replace value operation. Optimizer program 132 determines that the second PUI subsumes the first PUI and adds only the second PUI to the SUL (effectively removing the first PUI from the PUL). Through the iterative process of applying subsume rules to each of the PUIs in a PUL, optimizer program 132 creates an SUL that includes a sorted (in order of the hierarchically structured document) of only the PUIs that are necessary. The subsume rules are stored in database 134 and are depicted in matrix format in FIGS. 3, 4 and 5.

In step 206, optimizer program 132 receives one of a plurality of PUIs that exists in the PUL received in step 202. In one embodiment, optimizer program 132 parses a PUI and identifies the attributes (as defined earlier) associated with the PUI.

In step 208, optimizer program 132 sorts and applies subsume logic to the PUI received in step 206. The PUI will be identified as "incoming PUI" to delineate it from PUIs already in the SUL. Optimizer program 132 compares the target node of the incoming PUI with the target node of the tail of the SUL. If there are no PUIs in the SUL (e.g., the incoming PUI is the first of a plurality of PUIs that optimizer program 132 receives), optimizer program 132 adds the PUI to the SUL. If the SUL already includes one or more PUIs, optimizer program 132 determines whether the target node of the incoming PUI is the same as, or a descendant of, the target node of the tail of the SUL. If optimizer program 132 determines that the target node of the incoming PUI is the same as the target node of the tail of the SUL, optimizer program 132 processes the PUI according to the subsume matrix depicted in FIG. 3.

If optimizer program 132 determines that the target node of the incoming PUI is a descendant of the target node of the tail of the SUL, optimizer program 132 processes the PUI according to the subsume matrix depicted in FIG. 4. If the target node of the incoming PUI is not the same as, nor a descendant of, the target node of the tail of the SUL, and if optimizer program 132 determines that the target node of the incoming PUI is before (in document order) the target node of the tail of the SUL, then optimizer program 132 moves the incoming PUI into the SUL, in the correct position (in terms of document order). Subsequent to placing the incoming PUI into the correct position in the SUL, optimizer program 132 applies subsume logic to two PUIs, the incoming PUI and a preceding PUI in the SUL, wherein the preceding PUI is the PUI associated with the first non-attribute node found by optimizer program 132 searching the SUL list backward from the tail. If the incoming PUI is not subsumed, and it is a replace node update operation, a replace element content update operation, or a delete update operation, then optimizer program 132 applies the subsume logic to each of subsequent PUIs in the SUL until the PUI target node is outside the sub node. If the target node of the incoming PUI is not the same as, nor a descendant of, the target node of the tail of the SUL, and if optimizer program 132 determines that the target node of the incoming PUI is not before (in document order) the target node of the tail of the SUL, then optimizer program 132 adds the incoming PUI to the SUL.

In decision 210, optimizer program 132 determines whether the subsume logic has been applied to all PUIs in the PUL. In one embodiment, optimizer program 132 determines that the subsume logic has not been applied to all PUIs in the PUL (decision 210, NO branch), and optimizer program 132 receives a PUI (step 206). In one embodiment, optimizer program 132 determines that the subsume logic has been applied to all PUIs in the PUL (decision 210, YES branch), and optimizer program 132 executes the update operations in the SUL on the hierarchically structured document for which optimizer program 132 received a PUL in step 202 (step 212).

In step 212, optimizer program 132 executes the PUIs in the SUL, in the order listed, on the hierarchically structured document for which the PUL was intended. Based on the pre-processing that optimizer program 132 performed in prior steps, resulting in an optimized list of update operations (the SUL), optimizer program 132 executes only non-redundant update operations and completes the updates in one traversal of the hierarchically structured document.

FIG. 3 illustrates a subsume matrix, labeled Subsume Matrix 1, for consolidating pending update items if an incoming update item has the same target node as a previous update item, on a computing device within the computing environment of FIG. 1, in accordance with an embodiment of the present disclosure. Responsive to determining the operation type (e.g., insInto, insAttr, repValue) of the incoming PUI and the operation type of the previous PUI, optimizer program 132 performs the action (as indicated in the subsume matrix key) that corresponds to the correct combination of the two operation types. In the subsume matrix of FIG. 3, rows are previous (old) updates and columns are incoming (new) updates.

FIG. 4 illustrates a subsume matrix, labeled Subsume Matrix 2, for consolidating pending update items if a target node of an incoming pending update item is a descendant of a target node of a previous pending update item, on a computing device within the computing environment of FIG. 1, in accordance with an embodiment of the present disclosure. Responsive to determining the operation type (e.g., insInto, insAttr, repValue) of the incoming PUI and the operation type of the previous PUI, optimizer program 132 performs the action (as indicated in the subsume matrix key) that corresponds to the correct combination of the two operation types. In the subsume matrix of FIG. 4, rows are previous (old) updates and columns are incoming (new) updates.

FIG. 5 illustrates a subsume matrix, labeled Subsume Matrix 3, for consolidating pending update items if a target node of a previous pending update item is a descendant of a target node of an incoming pending update item, on a computing device within the computing environment of FIG. 1, in accordance with an embodiment of the present disclosure. Responsive to determining the operation type (e.g., insInto, insAttr, repValue) of the incoming PUI and the operation type of the previous PUI, optimizer program 132 performs the action (as indicated in the subsume matrix key) that corresponds to the correct combination of the two operation types. In the subsume matrix of FIG. 5, rows are previous (old) updates and columns are incoming (new) updates.

Figure 6:
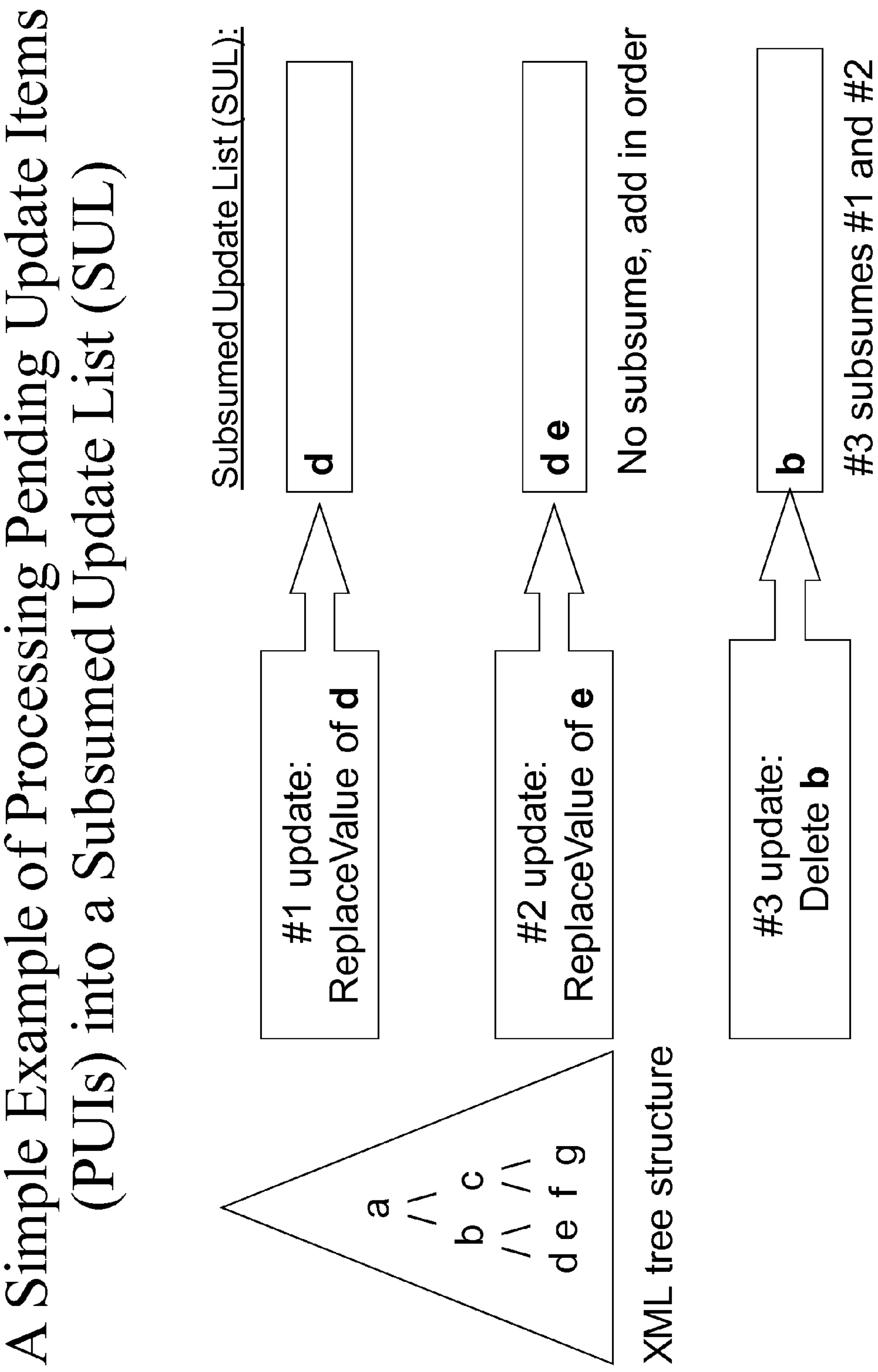
FIG. 6 illustrates an example of applying subsume logic to pending update items within a hierarchically structured document, on a computing device within the computing environment of FIG. 1, in accordance with an embodiment of the present disclosure.

FIG. 6 illustrates an example of applying subsume logic to pending update items within a hierarchically structured document, on a computing device within the computing environment of FIG. 1, in accordance with an embodiment of the present disclosure. A portion of a simple hierarchically structured (XML) document is shown, along with the resulting SUL that optimizer program 132 would create responsive to applying the three sample operations to a newly-initialized SUL. Optimizer program 132 adds the first update operation (ReplaceValue of d) to the SUL because there are no PUIs in the SUL. Optimizer program 132 adds the second update operation (ReplaceValue of e) to the SUL, in the appropriate order of the XML tree (i.e., after the previous update). Responsive to receiving the third update (Delete b), and determining that the target nodes (d and e) of the previous two updates are descendants of the target node (b) of the incoming update, optimizer program 132 searches for the appropriate action on subsume matrix 3, determines that the third update subsumes the first update and the second update, and adds the third update operation (Delete b) to the SUL.

FIG. 7 illustrates an example of applying redundant update operations to a selection of an XML document, on a computing device within the computing environment of FIG. 1, in accordance with an embodiment of the present disclosure. FIG. 7 depicts two sample PUIs and a portion of an XML document at three different stages of update. The first portion of the XML document depicts a portion of a document that describes two items (a lawnmower and a baby monitor) on a purchase order, and is shown prior to any updates having been performed. The second illustration depicts the same portion of the XML document after the operation in the first sample PUI (inserting a comment “affordable” to all items) has been applied. The third illustration depicts the same portion of the XML document after the operation in the second sample PUI (delete all items with a price over $100) has been applied. Using logic as described previously, and the subsume matrices for reference, optimizer program 132 would have determined that the second sample PUI (delete all items with a price over $100) would have subsumed the first sample PUI (insert a comment “affordable” to all items) in the instance where the item is a lawnmower (with a price of $149.99, which is greater than $100). As a result, optimizer program 132 would not have inserted the “affordable” comment into the lawnmower description before deleting the lawnmower item. This simple example demonstrates how the SUL created by optimizer program 132 may result in the application of fewer updates to a hierarchically structured document.

Figure 8:
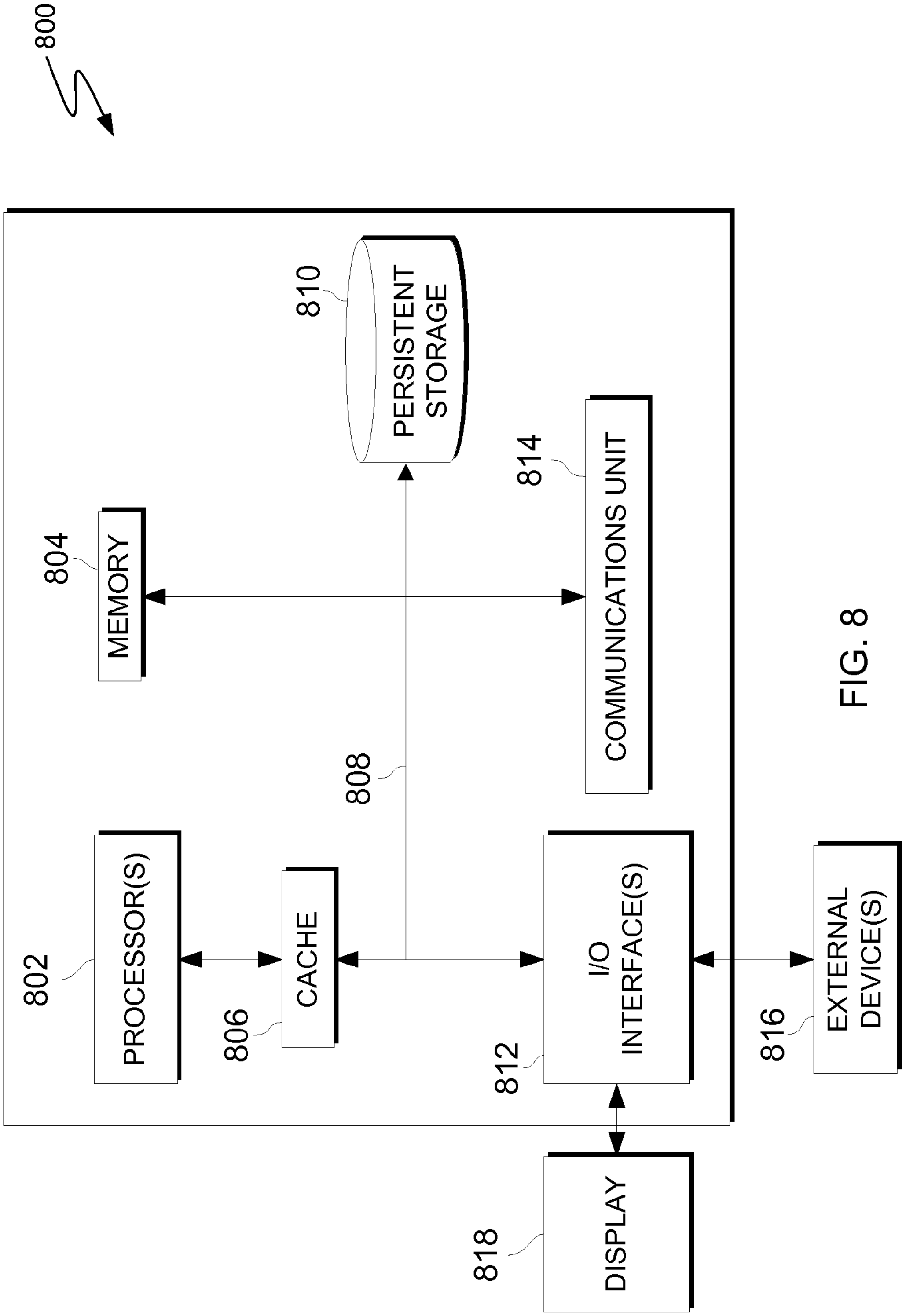
FIG. 8 is a block diagram of components of a computing device executing operations for optimizing update operations for hierarchically structured documents, in accordance with an embodiment of the present disclosure.

FIG. 8 is a block diagram of components of a computing device, generally designated 800, in accordance with an embodiment of the present disclosure. In one embodiment, computing device 800 is representative of server 130 within computing environment 100, in which case server 130 includes optimizer program 132.

It should be appreciated that FIG. 8 provides only an illustration of one implementation and does not imply any limitations with regard to the environments in which different embodiments may be implemented. Many modifications to the depicted environment may be made.

Computer system 800 includes processor(s) 802, cache 806, memory 804, persistent storage 810, input/output (I/O) interface(s) 812, communications unit 814, and communications fabric 808. Communications fabric 808 provides communications between cache 806, memory 804, persistent storage 810, communications unit 814, and input/output (I/O) interface(s) 812. Communications fabric 808 can be implemented with any architecture designed for passing data and/or control information between processors (such as microprocessors, communications and network processors, etc.), system memory, peripheral devices, and any other hardware components within a system. For example, communications fabric 808 can be implemented with one or more buses or a crossbar switch.

Memory 804 and persistent storage 810 are computer readable storage media. In this embodiment, memory 804 includes random access memory (RAM). In general, memory 804 can include any suitable volatile or non-volatile computer readable storage media. Cache 806 is a fast memory that enhances the performance of processor(s) 802 by holding recently accessed data, and data near recently accessed data, from memory 804.

Program instructions and data used to practice embodiments of the present invention may be stored in persistent storage 810 and in memory 804 for execution by one or more of the respective processor(s) 802 via cache 806. In an embodiment, persistent storage 810 includes a magnetic hard disk drive. Alternatively, or in addition to a magnetic hard disk drive, persistent storage 810 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 810 may also be removable. For example, a removable hard drive may be used for persistent storage 810. Other examples include optical and magnetic disks, thumb drives, and smart cards that are inserted into a drive for transfer onto another computer readable storage medium that is also part of persistent storage 810.

Communications unit 814, in these examples, provides for communications with other data processing systems or devices. In these examples, communications unit 814 includes one or more network interface cards. Communications unit 814 may provide communications through the use of either or both physical and wireless communications links. Program instructions and data used to practice embodiments of the present invention may be downloaded to persistent storage 810 through communications unit 814.

I/O interface(s) 812 allows for input and output of data with other devices that may be connected to each computer system. For example, I/O interface(s) 812 may provide a connection to external device(s) 816 such as a keyboard, keypad, a touch screen, and/or some other suitable input device. External device(s) 816 can also include portable computer readable storage media such as, for example, thumb drives, portable optical or magnetic disks, and memory cards. Software and data used to practice embodiments of the present invention can be stored on such portable computer readable storage media and can be loaded onto persistent storage 810 via I/O interface(s) 812. I/O interface(s) 812 also connect to display 818.

Display 818 provides a mechanism to display or present data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

receiving, by one or more processors, a pending update list including a first plurality of items, wherein each item of the first plurality of items describes an update to a hierarchically structured document;

adding, by one or more processors, each of one or more items of the first plurality of items to a subsumed update list having a second plurality of items, wherein the subsumed update list is ordered based, at least in part, on a document order and on a target node of each of the second plurality of items;

applying, by one or more processors, subsume logic to each of the one or more items based, at least in part, on the second plurality of items, wherein applying the subsume logic to each of the one or more items pre-processes the pending update list, thereby consolidating redundant updates and removing conflicting updates;

comparing, by one or more processors, a first target node of a first item of the one or more items to a second target node of a second item of the second plurality of items, wherein the second item is a tail of the subsumed update list;

responsive to determining, by one or more processors, that the first target node is the same as or is a descendant of the second target node, applying, by one or more processors, the subsume logic to the first item based, at least in part, on at least one subsume matrix; and responsive to determining, by one or more processors, that the subsume logic has been applied to each item of the first plurality of items, executing, by one or more processors, each of the second plurality of items of the subsumed update list.

2. The method of claim 1, wherein applying the subsume logic to each of the one or more items further includes:

receiving, by one or more processors, a first subsume matrix, a second subsume matrix, and a third subsume matrix, wherein each subsume matrix specifies one or more subsume rules, and wherein:

the first subsume matrix applies to a first incoming item and a first previous item wherein a target node of the first incoming item is the same as a target node of the first previous item;

the second subsume matrix applies to a second incoming item and a second previous item wherein a target node of the second incoming item is a descendant of a target node of the second previous item; and the third subsume matrix applies to a third incoming item and a third previous item wherein a target node of the third previous item is a descendant of a target node of the third incoming item.

3. The method of claim 2, wherein adding the one or more items to the subsumed update list further comprises:

comparing, by one or more processors, a first target node of a first item of the one or more items to a second target node of a second item of the second plurality of items, wherein the second item is a tail of the subsumed update list; and responsive to determining, by one or more processors, that the first target node is before the second target node in the document order:

adding, by one or more processors, the first item to the subsumed update list based, at least in part, on the document order and on the first target node;

identifying, by one or more processors, a non-attribute node by searching backwards through the subsumed update list from the tail; and applying, by one or more processors, the subsume logic to the first item and a preceding item in the subsumed update list, wherein the preceding item is associated with the non-attribute node.

4. The method of claim 3, further comprising:

determining, by one or more processors, a subsume rule of the one or more subsume rules to apply based, at least in part, on an operation type of an incoming item of the one or more items and an operation type of a previous item of the subsumed update list.

5. The method of claim 4, wherein executing each item of the subsumed update list is performed in a single traversal of the hierarchically structured document.

6. The method of claim 1, wherein the hierarchically structured document is an extended markup language document.

7. A computer program product comprising:

a computer readable storage medium and program instructions stored on the computer readable storage medium, the program instructions comprising:

program instructions to receive a pending update list including a first plurality of items, wherein each item of the first plurality of items describes an update to a hierarchically structured document;

program instructions to add each of one or more items of the first plurality of items to a subsumed update list having a second plurality of items, wherein the subsumed update list is ordered based, at least in part, on a document order and on a target node of each of the second plurality of items;

program instructions to apply subsume logic to each of the one or more items based, at least in part, on the second plurality of items, wherein applying the subsume logic to each of the one or more items pre-processes the pending update list, thereby consolidating redundant updates and removing conflicting updates;

program instructions to compare a first target node of a first item of the one or more items to a second target node of a second item of the second plurality of items, wherein the second item is a tail of the subsumed update list;

program instructions to, responsive to determining that the first target node is the same as or is a descendant of the second target node, apply the subsume logic to the first item based, at least in part, on at least one subsume matrix; and program instructions to, responsive to determining that the subsume logic has been applied to each item of the first plurality of items, execute each of the second plurality of items of the subsumed update list.

8. The computer program product of claim 7, wherein the program instructions to apply the subsume logic to each of the one or more items further include:

program instructions to receive a first subsume matrix, a second subsume matrix, and a third subsume matrix, wherein each subsume matrix specifies one or more subsume rules, and wherein:

the first subsume matrix applies to a first incoming item and a first previous item wherein a target node of the first incoming item is the same as a target node of the first previous item;

the second subsume matrix applies to a second incoming item and a second previous item wherein a target node of the second incoming item is a descendant of a target node of the second previous item; and the third subsume matrix applies to a third incoming item and a third previous item wherein a target node of the third previous item is a descendant of a target node of the third incoming item.

9. The computer program product of claim 8, wherein the program instructions to add the one or more items to the subsumed update list further comprise:

program instructions to compare a first target node of a first item of the one or more items to a second target node of a second item of the second plurality of items, wherein the second item is a tail of the subsumed update list; and program instructions to, responsive to determining that the first target node is before the second target node in the document order:

add the first item to the subsumed update list based, at least in part, on the document order and on the first target node;

identify a non-attribute node by searching backwards through the subsumed update list from the tail; and apply the subsume logic to the first item and a preceding item in the subsumed update list, wherein the preceding item is associated with the non-attribute node.

10. The computer program product of claim 9, wherein the program instructions further comprise:

program instructions to determine a subsume rule of the one or more subsume rules to apply based, at least in part, on an operation type of an incoming item of the one or more items and an operation type of a previous item of the subsumed update list.

11. The computer program product of claim 10, wherein the program instructions to execute each item of the subsumed update list are performed in a single traversal of the hierarchically structured document.

12. A computer system comprising:

one or more computer processors;

one or more computer readable storage media;

program instructions stored on the one or more computer readable storage media for execution by at least one of the one or more processors, the program instructions comprising:

program instructions to receive a pending update list including a first plurality of items, wherein each item of the first plurality of items describes an update to a hierarchically structured document;

program instructions to add each of one or more items of the first plurality of items to a subsumed update list having a second plurality of items, wherein the subsumed update list is ordered based, at least in part, on a document order and on a target node of each of the second plurality of items;

program instructions to apply subsume logic to each of the one or more items based, at least in part, on the second plurality of items, wherein applying the subsume logic to each of the one or more items pre-processes the pending update list, thereby consolidating redundant updates and removing conflicting updates;

program instructions to compare a first target node of a first item of the one or more items to a second target node of a second item of the second plurality of items, wherein the second item is a tail of the subsumed update list;

program instructions to, responsive to determining that the first target node is the same as or is a descendant of the second target node, apply the subsume logic to the first item based, at least in part, on at least one subsume matrix; and program instructions to, responsive to determining that the subsume logic has been applied to each item of the first plurality of items, execute each of the second plurality of items of the subsumed update list.

13. The computer system of claim 12, wherein the program instructions to apply the subsume logic to each of the one or more items further include:

program instructions to receive a first subsume matrix, a second subsume matrix, and a third subsume matrix, wherein each subsume matrix specifies one or more subsume rules, and wherein:

the first subsume matrix applies to a first incoming item and a first previous item wherein a target node of the first incoming item is the same as a target node of the first previous item;

the second subsume matrix applies to a second incoming item and a second previous item wherein a target node of the second incoming item is a descendant of a target node of the second previous item; and the third subsume matrix applies to a third incoming item and a third previous item wherein a target node of the third previous item is a descendant of a target node of the third incoming item.

14. The computer system of claim 13, wherein the program instructions to add the one or more items to the subsumed update list further comprise:

program instructions to compare a first target node of a first item of the one or more items to a second target node of a second item of the second plurality of items, wherein the second item is a tail of the subsumed update list; and program instructions to, responsive to determining that the first target node is before the second target node in the document order:

add the first item to the subsumed update list based, at least in part, on the document order and on the first target node;

identify a non-attribute node by searching backwards through the subsumed update list from the tail; and apply the subsume logic to the first item and a preceding item in the subsumed update list, wherein the preceding item is associated with the non-attribute node.

15. The computer system of claim 14, wherein the program instructions further comprise:

program instructions to determine a subsume rule of the one or more subsume rules to apply based, at least in part, on an operation type of an incoming item of the one or more items and an operation type of a previous item of the subsumed update list.

16. The computer system of claim 15, wherein the program instructions to execute each item of the subsumed update list are performed in a single traversal of the hierarchically structured document.

* * * * *